July 31, 1928.
G. BÜHLER
SUCTION APPARATUS
Filed April 20, 1926
1,678,932
2 Sheets-Sheet 1
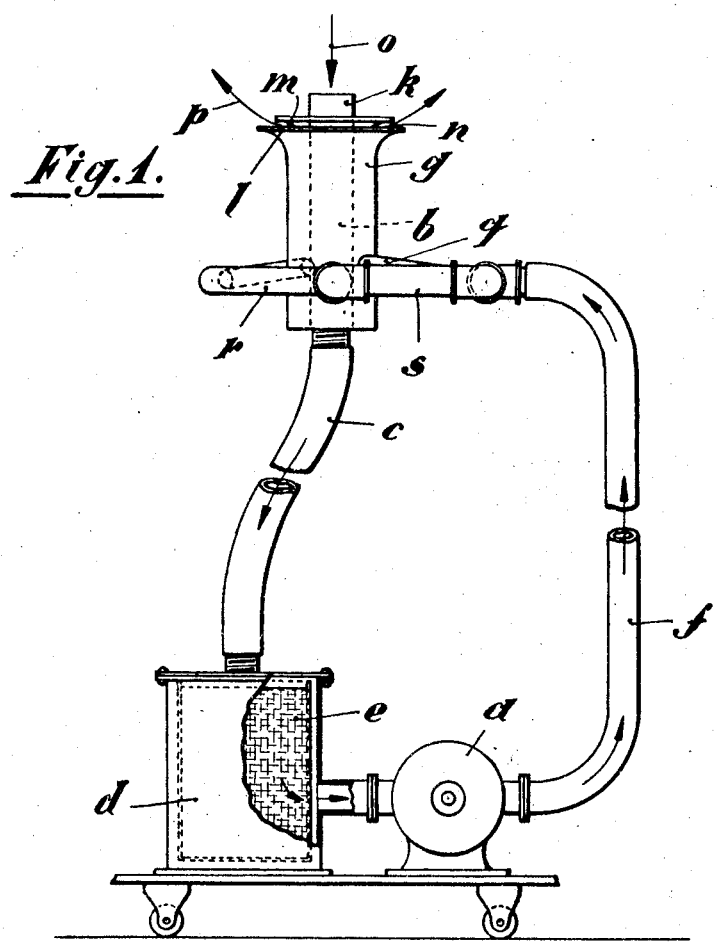
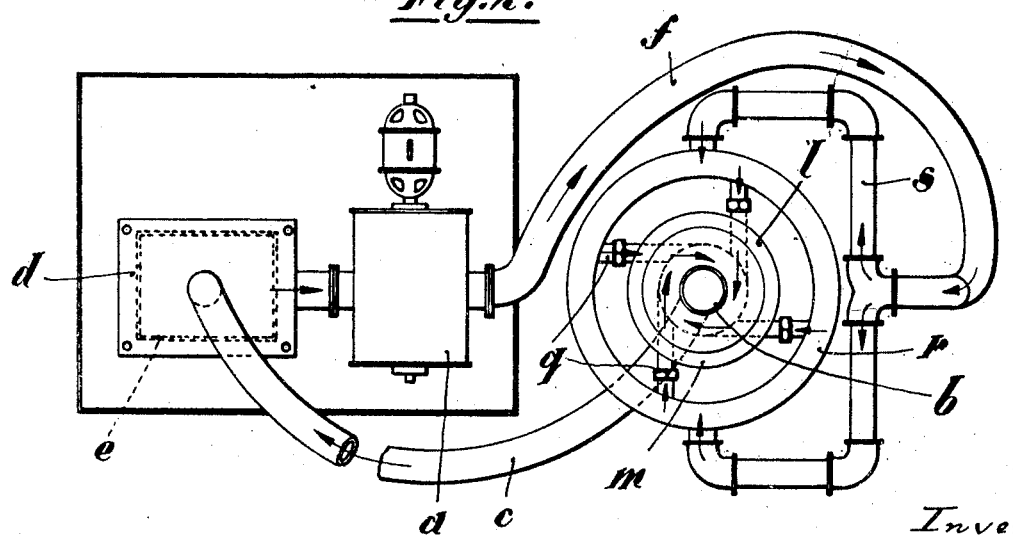
Inventor:
Georg Bühler July 31, 1928.  1,678,932
G. BÜHLER
SUCTION APPARATUS
Filed April 20, 1926  2 Sheets-Sheet 2
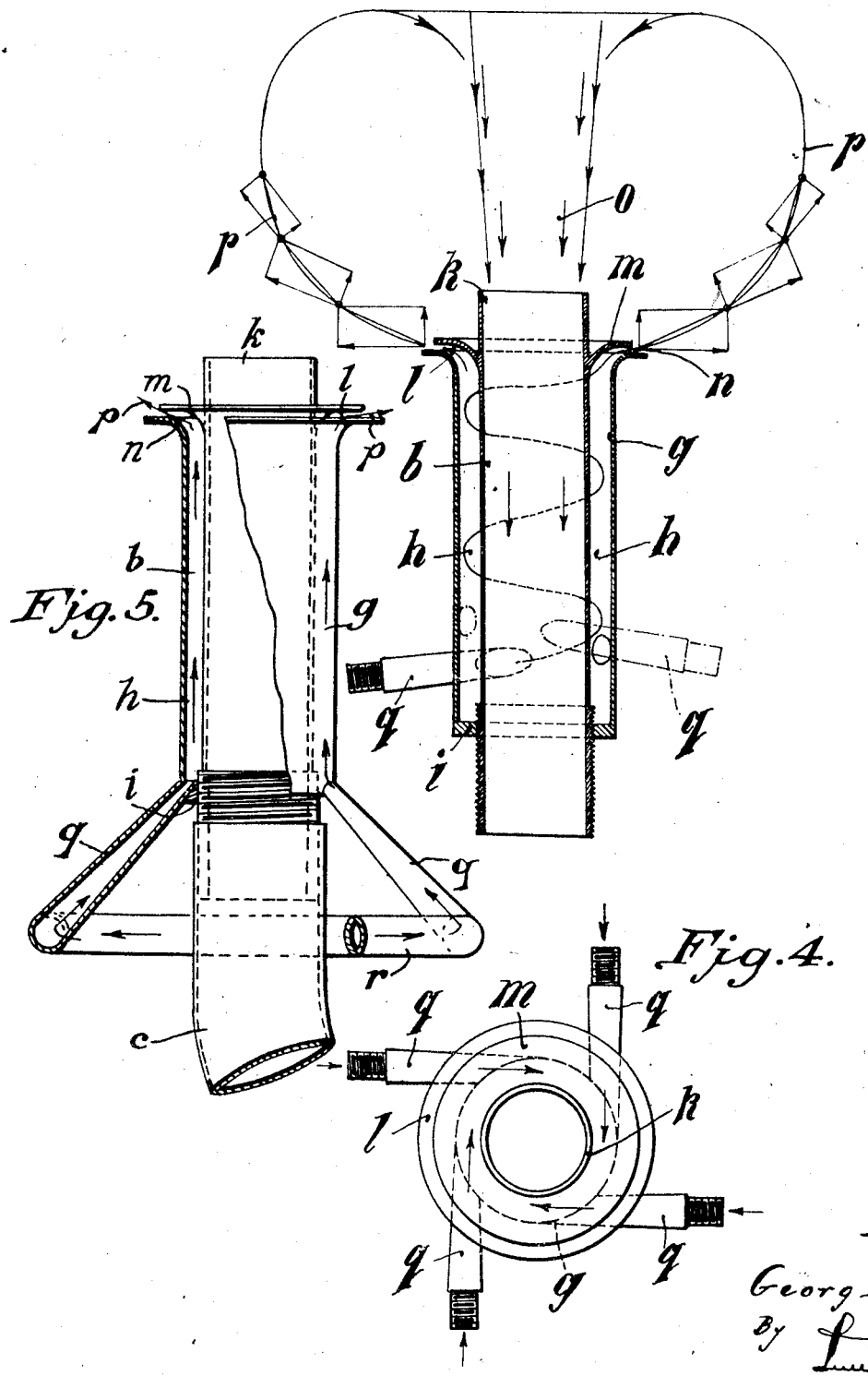

Patented July 31, 1928.

1,678,932

UNITED STATES PATENT OFFICE.

GEORG BÜHLER, OF STEINENKIRCH, NEAR GEISLINGEN-ON-THE-STEIGE, GERMANY.

SUCTION APPARATUS.

Application filed April 20, 1926, Serial No. 103,315, and in Germany February 19, 1925.

The present invention relates to suction apparatus particularly adapted for the cleaning of automobiles.

The invention resides in the fact that a gaseous or fluid pressure mantle, replacing the rigid suction funnel, is produced about the zone or field of suction of the apparatus; such mantle permitting the entrance of the air to be sucked in only at its forward end.

For cleaning the outer walls of automobiles and other vehicles, the air is forced under high pressure through an annular nozzle and, from a certain distance, is again sucked in by an intermediate nozzle. The cleaning of an automobile can accordingly be undertaken, in any space, without the heretofore customary flooding of all the surroundings with water. At the same time, dust, sand or particles of dirt are prevented from being sucked into the driving mechanism by the air current but, instead, are removed without being able to escape through the pressure air.

The air or other gaseous fluid under pressure is discharged around the suction mouthpiece in opposition to the direction of suction, so that it forms a moving mantle or curtain which, after being drawn back into the suction pipe and then cleaned in a filter, is conducted to a fan or blower and again ejected in mantle form in opposition to the direction of suction and coaxially therewith. Such mantle, as will be understood, issues from the suction mouth-piece and surrounds the zone or field of suction, and it holds itself motionless against the surrounding still air. The length of the mantle, accordingly, is dependent upon the speed of discharge of the fluid about the suction mouth-piece.

In the accompanying drawing:

Figure 1 is an elevation of the apparatus as a whole arranged on a portable frame. Such a construction may be used for example for the purification of stables.

Figure 2 is a plan, the upper portion being displaced to the right so as to permit of the lower portion being clearly shown.

Figure 3 is a longitudinal section through the mouth-piece also showing diagrammatically the air paths.

Figure 4 is a plan of Figure 3.

Figure 5 shows a further constructional form of the suction mouth-piece.

A fan $a$ or equivalent device sucks the air to be purified through a tubular mouth-piece $b$ and connected flexible tube $c$ into a dust-separator $d$ which may be of suitable construction known in the dust-exhauster art. The dust and other impurities, for example insects, contained in the drawn-in air are collected and retained in the dust-separator by means of a filter $e$ or a dust-bag or a sieve. If the apparatus be mainly intended for the destruction of insects, suitable chemical substances may be introduced into the receptacle of the dust-separator, the said chemical substances being of such a nature as to destroy or kill the insects trapped in the filter.

The air purified in the dust-separator $d$ is then forced through the fan $a$ into a pressure-pipe or tube $f$ which advantageously may consist of a material of a flexible nature such as a rubber tube or a hose pipe. The pressure-pipe $f$ in the apparatus illustrated then discharges into the proper apparatus which forms the aforesaid pressure-airmantle surrounding the suction-mouthpiece. This apparatus consists of a second tube $g$ which is of greater diameter than the suction-tube $b$ and concentrically surrounds the latter so that a circular pressure-air-passage $h$ exists between the tubular mouth-piece $b$ and the second tube $g$. The tube $g$ is closed at its rear end by an internal flange $i$ (see Figure 3) and is somewhat shorter than the tube $b$ whose inlet $k$ extends above the outlet of the tube $g$. The pressure-air-tube $g$ is of funnel-shape at its upper end $l$ and the ring $m$ corresponding in form to this trumpet formation of the upper end of the tube $g$ is superimposed on the tubular mouth-piece $b$ and secured thereto so that between the parts $l$ and $m$ a gradually narrowing circular space is provided which forms a radially or approximately radially directed circular outlet $n$. The pressure-air in the pressure-passage $h$ is, as shown in Figure 3, radially directed and flows at great velocity out of the outlet $n$ and is directed inwardly towards the suction-zone $o$ by the exterior or surrounding air until it gradually becomes deflected into the said suction-zone so that it forms a wide pressure-air-mantle or zone surrounding the suction-zone. The pressure-air-mantle is indicated diagrammatically by the arrows $p$ and its length from the mouth-piece up to its outer end depends on the velocity of the pressure-air discharging from the outlet end $n$. The initial velocity of the out-streaming pressure-air is naturally and gradually reduced by the resistance of the surrounding air until deflection and transition into the suction-air-stream take place. Counter-friction between both opposed air-streams o and p cannot take place because the inlet k projects above the pressure air outlet n and because the pressure-air-stream is horizontally and radially directed relatively to the suction-stream. There also arises a pressure-air-mantle which surrounds the suction-zone o after the manner of a funnel of rigid material and this permits of the entry of the suction-air only at its forward end. The individual air-streams which collectively form the pressure-air-mantle p can be directed in such manner as to follow the lines of the said mantle whereby the pressure-air flows out of the outlet n in a radial direction, as shown in Fig. 5. In this arrangement the pressure-air at the rear end of the pressure-air-mantle p is directed approximately axially and delivered through injector tubes q which branch from a circular distribution tube or pipe r, the latter being connected with the pressure-air-pipe f by a T-piece s. In many cases, however, it may be advantageous to distribute the air streams of the pressure-air-mantle p in such manner as to impart thereto a rotary screw-like movement about the axis of the suction-zone, as shown in Figs. 3 and 4. In this arrangement the injector pipes or tubes q extending from the distribution pipe r are arranged tangentially and at increasing elevations so as to discharge into the pressure-air-tube g at such an angle as to produce the helical or rotary screw-like-movement above referred to in the pressure-air-passage h.

Many constructional forms of the present apparatus are possible which fall within the scope of the invention as claimed, the essential feature of the invention consisting in the formation of a pressure-air-mantle about the suction-zone of a suction-mouth-piece which replaces a fixed funnel of rigid material.

What I claim is:—

1. Suction and purifying apparatus for air, comprising a suction tube provided with a mouth-piece; a pressure tube concentrically surrounding the suction tube and spaced from the same to form an intermediate passage, said pressure tube having its rear end closed and its front end widened and turned laterally outward; a ring adjacent the front end of the suction tube and coacting with the out-turned end of the pressure tube to form a funnel-shaped outlet nozzle; and means for supplying air under pressure to the rear portion of said passage to escape through such nozzle in the form of an annular mantle which concentrically surrounds the suction zone extending from said mouth-piece.

2. Apparatus according to claim 1, in which the inlet end of the suction tube projects above the outlet nozzle for the air under pressure.

3. Apparatus according to claim 1, in which the means for supplying air under pressure to the air passage comprise a plurality of peripherally-distributed injector tubes opening into said passage, and an annular distributor pipe to which such tubes are connected, said distributor pipe being connected to a source of air under pressure.

4. Apparatus according to claim 1, in which the means for supplying air under pressure to the air passage comprise a plurality of tangentially-arranged injector tubes distributed around and opening into said passage at different levels, and an annular distributor pipe to which such tubes are connected, said distributor pipe being connected to a source of air under pressure.

5. Suction and purifying apparatus for air, comprising a suction tube provided with a mouth-piece; a pressure tube concentrically surrounding the suction tube and spaced from the same to form an intermediate passage, said pressure tube having its rear end closed and its front end widened and turned laterally outward; a ring adjacent the front end of the suction tube and coacting with the out-turned end of the pressure tube to form a funnel-shaped outlet nozzle; a blower; and a filter intermediate the suction tube and the suction side of the blower and connected thereto, the pressure side of said blower being connected to the air passage to supply air under pressure to said passage to escape from the nozzle in the form of an annular mantle which concentrically surrounds the suction zone extending from said mouth-piece.

In testimony whereof I affix my signature.

GEORG BÜHLER.